(12) United States Patent
Berkemeier et al.

(10) Patent No.: US 10,829,045 B2
(45) Date of Patent: Nov. 10, 2020

(54) SYSTEM AND METHOD FOR CALIBRATING A MOTION ESTIMATION ALGORITHM USING A VEHICLE CAMERA

(71) Applicant: Continental Automotive Systems, Inc., Auburn Hills, MI (US)

(72) Inventors: Matthew Donald Berkemeier, Beverly Hills, MI (US); Kyle P Carpenter, Rochester, MI (US); Julien Ip, Madison Heights, MI (US); Dhiren Verma, Farmington Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/507,749

(22) Filed: Jul. 10, 2019

(65) Prior Publication Data

US 2020/0017025 A1 Jan. 16, 2020

Related U.S. Application Data

(60) Provisional application No. 62/696,478, filed on Jul. 11, 2018.

(51) Int. Cl.
*G08B 21/00* (2006.01)
*B60R 1/00* (2006.01)
(Continued)

(52) U.S. Cl.
CPC ............ *B60R 1/00* (2013.01); *B60R 11/04* (2013.01); *B62D 13/06* (2013.01); *B62D 15/025* (2013.01);
(Continued)

(58) Field of Classification Search
CPC ..... B60R 1/00; B60R 11/04; B60R 2300/808; G06T 7/80; G06T 7/20;
(Continued)

(56) References Cited

U.S. PATENT DOCUMENTS 9,290,202 B2 * 3/2016 Lavoie ................. B60W 30/00
2005/0074143 A1   4/2005 Kawai
(Continued)

FOREIGN PATENT DOCUMENTS

WO    2016164118 A2    10/2016

OTHER PUBLICATIONS

International Search Report and the Written Opinion of the International Searching Authority dated Oct. 21, 2019 for corresponding PCT application No. PCT/2019/041357.

*Primary Examiner* — Anh V La

(57) ABSTRACT

A method of calibrating a driver assistance system comprises entering a calibration mode for a driver assistance system, determining a first estimated position and heading of the vehicle at a first location, capturing an image from a camera and selecting at least one feature in the image. The method of calibrating also includes moving the vehicle to a second location and heading and determining a second estimated position and heading of the vehicle, capturing a second image from a camera and selecting at least one feature in the second image, where the selected feature in the second image the same feature as the selected feature in the first image. The method also includes calculating new vehicle motion parameter values based on the first estimated position and heading, second estimated position and heading, first recorded at least one feature data, and second recorded at least one feature data.

20 Claims, 5 Drawing Sheets

(51) Int. Cl.
*G06T 7/80* (2017.01)
*G06T 7/20* (2017.01)
*B62D 13/06* (2006.01)
*B62D 15/02* (2006.01)
*B60R 11/04* (2006.01)

(52) U.S. Cl.
CPC .................. *G06T 7/20* (2013.01); *G06T 7/80* (2017.01); *B60R 2300/808* (2013.01); *G06T 2207/30252* (2013.01)

(58) Field of Classification Search
CPC ........... G06T 2207/30252; G06T 7/254; G06T 2207/30241; B62D 13/06; B62D 15/025; B60D 1/62; B60D 1/36; B60D 1/06; H04N 7/183
USPC .... 340/431, 435, 436, 686.1, 686.6; 701/28, 701/42
See application file for complete search history.

(56) References Cited

U.S. PATENT DOCUMENTS

2014/0267688 A1 9/2014 Aich et al.
2018/0350108 A1* 12/2018 Wang .................... H04N 7/183

\* cited by examiner

SYSTEM AND METHOD FOR CALIBRATING A MOTION ESTIMATION ALGORITHM USING A VEHICLE CAMERA

TECHNICAL FIELD

This disclosure relates to an automotive vehicle, and more particularly to a driver assistance system for automotive vehicles to aid in hitching the vehicle to a trailer.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some example, the trailer is electrically connected to the tow vehicle. As such, the electrical connection allows the trailer to take the feed from the powered vehicle's rear light circuit, allowing the trailer to have taillights, turn signals, and brake lights that are in sync with the powered vehicle's lights.

Some of the challenges that face tow vehicle drivers are connecting the tow vehicle to the trailer, because more than one person is needed. For example, one person drives the vehicle, e.g., the driver, and another one or more people are needed to view the tow vehicle and the trailer and provide the driver with direction regarding the path the tow vehicle has to take to align with the hitch. If the people providing directions to the driver are not accustomed to hitching a tow vehicle to a trailer, then they may have difficulty providing efficient instructions for directing the path of the tow vehicle.

Recent advancements in sensor technology have led to improved safety systems for vehicles. Arrangements and methods for detecting and avoiding collisions are becoming available. Such driver assistance systems use sensors located on the vehicle to detect an ongoing collision. In some examples, the system may warn the driver of one or more driving situations to prevent or minimize collisions. Additionally, sensors and cameras may also be used to alert a driver of possible obstacles when the vehicle is traveling in a forward direction. Therefore, it is desirable to provide a system that includes sensors to overcome the challenges faced by drivers of tow vehicles.

Additionally, vehicles with driver assist functions sometimes utilize motion estimation algorithms. Such a motion estimation algorithm makes use of a vehicle model and sensor inputs, such as wheel encoder values and the steering wheel angle, to estimate the relative position and velocity of the vehicle over time. The terms "odometry" and "dead reckoning" are often used for such schemes.

For example, an automated function for reversing a truck to a trailer may require an accurate motion estimation algorithm so that the truck can follow a user-selected path to the trailer. Such a motion estimation algorithm would utilize several vehicle kinematic parameters, such as steering ratio, steering offset, tire diameter, wheelbase, track width, etc. While some parameters, such as the wheelbase, may be known accurately, the tire diameter, steering ratio, and steering offset may not be known with sufficient accuracy/precision for good motion estimation. For the case of reversing a truck to a trailer coupler, accuracy is needed on the order of centimeters over several meters of motion. This requires very good knowledge of the truck kinematic parameters.

One approach to determining the parameters involves careful direct measurements of all unknown parameters. However, this is often inconvenient and imprecise.

Another approach involves the execution of some test maneuvers while monitoring the vehicle sensor inputs. For example, tire diameters can be determined by driving the vehicle straight for some calibrated distance, like 20 meters, and monitoring the wheel encoder values. Similarly, steering ratio could be determined by fixing the steering wheel at a particular angle (which can be read from the steering wheel angle sensor) driving the vehicle forward or backward, and measuring the resulting radius of the actual vehicle path.

Another approach to determining the parameters is similar but utilizes a reference Differential GPS system for measuring the vehicle motion, rather than marking out a calibrated distance, such as the 20 meters mentioned above, or measuring the vehicle path radius.

SUMMARY

One general aspect includes a method of calibrating a driver assistance system, the method including: entering a calibration mode for a driver assistance system. The method of calibrating also includes moving a vehicle to a first location and heading. The method of calibrating also includes recording with a controller for the driver assistance system a current estimated position and heading of the vehicle at the first location. The method of calibrating also includes displaying a first image from at least one camera outwardly facing from the vehicle. The method of calibrating also includes selecting at least one feature in the first image by using an input mechanism and recording with a controller for the driver assistance system the at least one selected feature data at the first location and heading. The method of calibrating also includes moving a vehicle to at least a second location and heading. The method of calibrating also includes recording with a controller for the driver assistance system a current estimated position and heading of the vehicle at the at least second location. The method of calibrating also includes displaying a second image from the at least one camera. The method of calibrating also includes selecting at least one feature in the second image by using the input mechanism and recording with a controller for the driver assistance system the at least one selected feature data at the second location and heading, where the at least one selected feature is the same feature as the previously at least one selected feature. The method of calibrating also includes calculating with the controller new vehicle motion parameter values based on the first estimated position and heading, second estimated position and heading, first recorded at least one feature data, and second recorded at least one feature data.

Implementations may include one or more of the following features. The method where the vehicle motion parameter values include at least one of: wheelbase, track width, tire diameter, steering offset and steering ratio, the moving the vehicle includes, steering, braking, and acceleration.

The method where the driver assistance system is a hitch assist system and the at least one feature is at least a hitch receiver on a trailer.

The method where the motion calibration method is completed a first time the driver assistance system is used.

The method where the motion calibration method updated at periodic intervals or at user discretion.

The method where the input mechanism is at least one of: a touchscreen, a knob control, a mouse, joystick, a slider bar.

The method further including using the new vehicle motion parameter values to execute at least one driver assistance function of the driver assistance system.

One general aspect includes a method of calibrating a driver assistance system, the method including: entering a calibration mode for a driver assistance system. The method of calibrating also includes determining with a controller for the driver assistance system a first estimated position and heading of the vehicle at a first location. The method of calibrating also includes capturing an image from at least one camera outwardly facing from the vehicle and selecting at least one feature in the image. The method of calibrating also includes moving a vehicle to at least a second location and heading and determining a second estimated position and heading of the vehicle. The method of calibrating also includes capturing a second image from at least one camera outwardly facing from the vehicle and selecting at least one feature in the second image, where the at least one selected feature in the second image the same feature as the at least one selected feature in the first image. The method of calibrating also includes calculating with the controller new vehicle motion parameter values based on the first estimated position and heading, second estimated position and heading, first recorded at least one feature data, and second recorded at least one feature data.

Implementations may include one or more of the following features. The method where the vehicle motion parameter values include at least one of: wheelbase, track width, tire diameter, steering offset and steering ratio, the moving the vehicle includes, steering, braking, and acceleration.

The method where the driver assistance system is a hitch assist system and the at least one feature is at least a hitch receiver on a trailer.

The method where the motion calibration method is completed a first time the driver assistance system is used.

The method where the motion calibration method updated at periodic intervals or at user discretion.

The method further including selecting the at least one feature with an input mechanism.

The method where the input mechanism is at least one of: a touchscreen, a knob control, a mouse, joystick, a slider bar.

The method further including using the new vehicle motion parameter values to execute at least one driver assistance function of the driver assistance system.

One general aspect includes a driver assistance system including: a controller having instructions for calibrating vehicle motion parameter values for the driver assistance system the instructions including; determining with a controller for the driver assistance system a first estimated position and heading of the vehicle at a first location; capturing an image from at least one camera outwardly facing from the vehicle and selecting at least one feature in the image; determining a second estimated position and heading of the vehicle after the vehicle has been moved to a second location; capturing a second image from at least one camera outwardly facing from the vehicle and selecting at least one feature in the second image, where the at least one selected feature in the second image the same feature as the at least one selected feature in the first image; and calculating with the controller new vehicle motion parameter values based on the first estimated position and heading, second estimated position and heading, first recorded at least one feature data, and second recorded at least one feature data.

Implementations may include one or more of the following features. The system where the vehicle motion parameter values include at least one of: wheelbase, track width, tire diameter, steering offset and steering ratio, the moving the vehicle includes, steering, braking, and acceleration.

The system where the driver assistance system is a hitch assist system and the at least one feature is at least a hitch receiver on a trailer.

The system where the controller calibrates vehicle motion parameter values is completed a first time the driver assistance system is used and the motion calibration method updated at periodic intervals or at user discretion.

The system further including an input mechanism to select the at least one feature, where the input mechanism is at least one of: a touchscreen, a knob control, a mouse, joystick, a slider bar.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

DESCRIPTION OF DRAWINGS

The present disclosure will become more fully understood from the detailed description and the accompanying drawings, wherein.

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable to have a tow vehicle that is capable to having a more automated system and method for maneuvering towards a trailer and attaching to the trailer, thus reducing the need for a driver to drive the tow vehicle in a rearward direction while another one or more people provide the driver with directions regarding the path that the tow vehicle has to take to align with the trailer and ultimately a hitch of the trailer. As such, a tow vehicle with an assistance device for rearward driving provides a driver with a safer and faster experience when hitching the tow vehicle to the trailer.

Figure 1A:
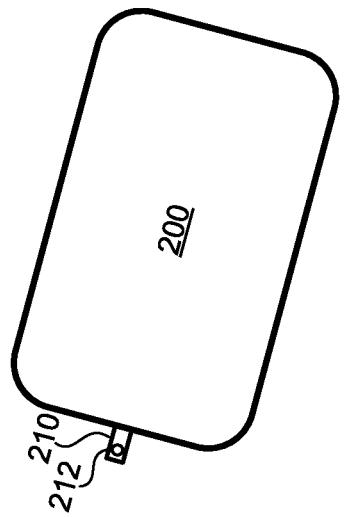
FIG. 1A is a schematic view of an exemplary tow vehicle and a trailer behind the tow vehicle.
Figure 1A:
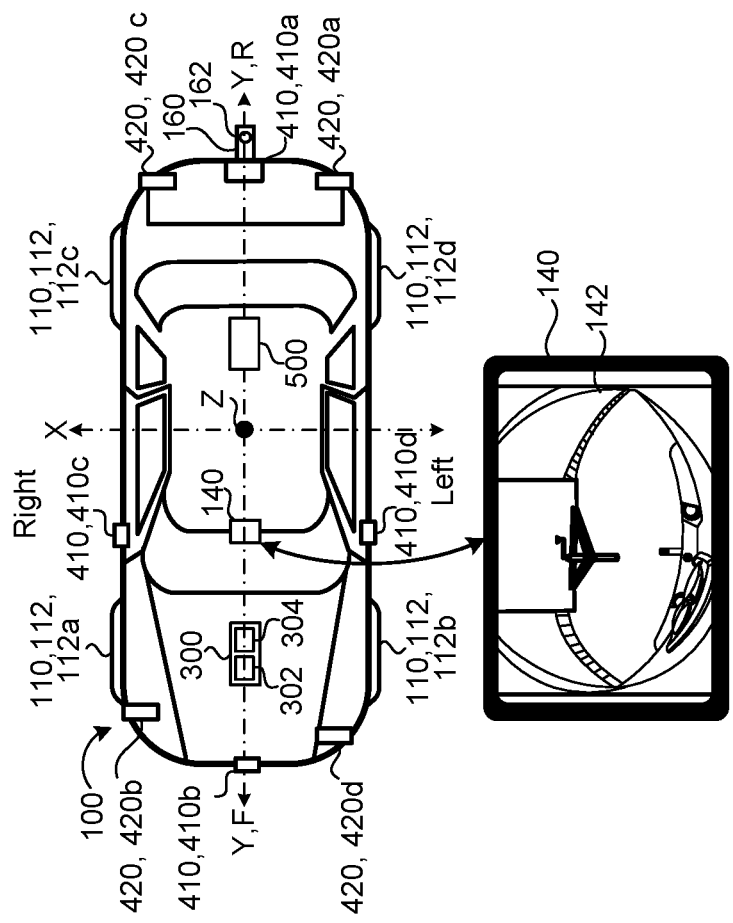
Figure 1B:
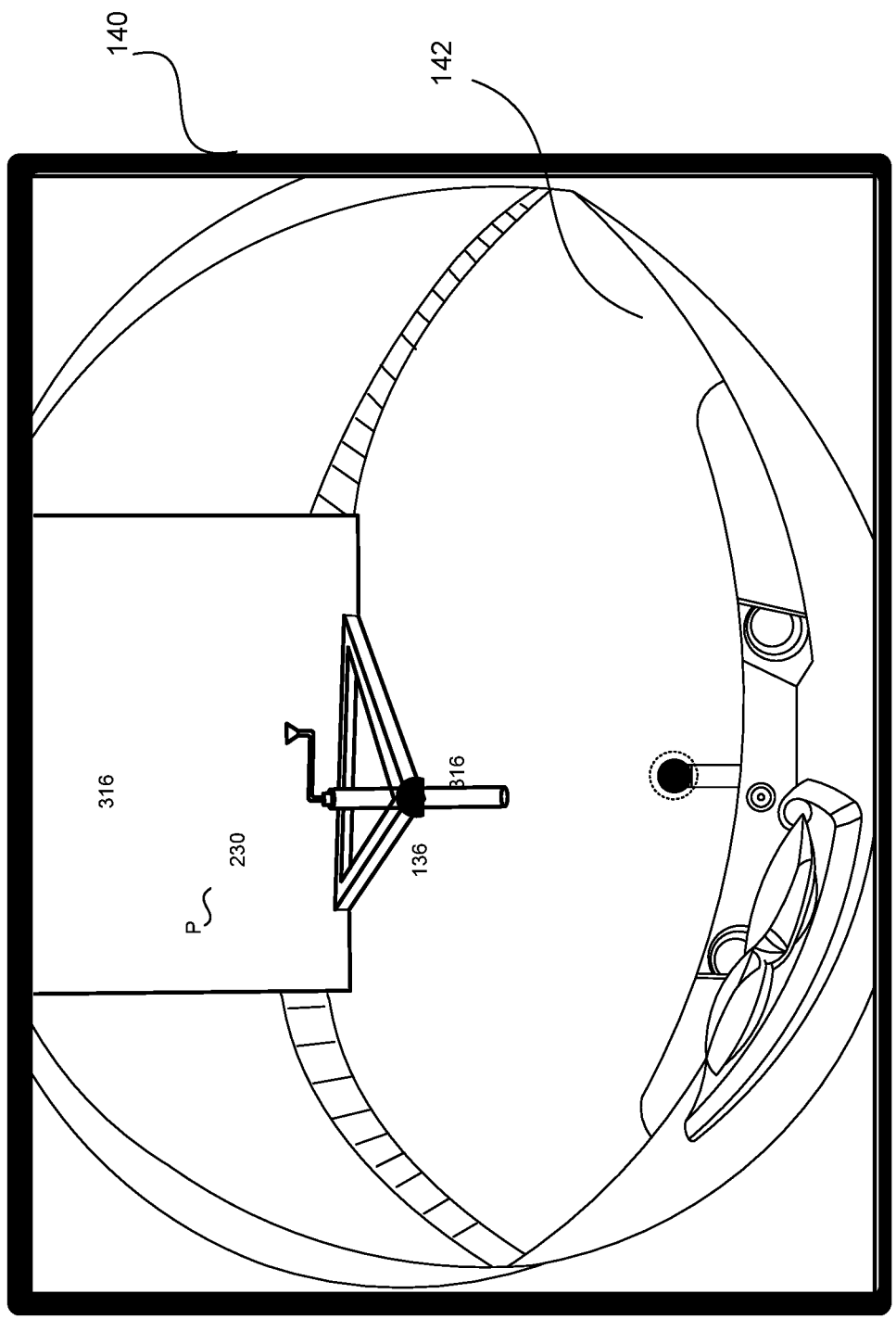
FIG. 1B is a schematic view of an exemplary user interface for detecting a trailer hitch receiver location.
Figure 1C:
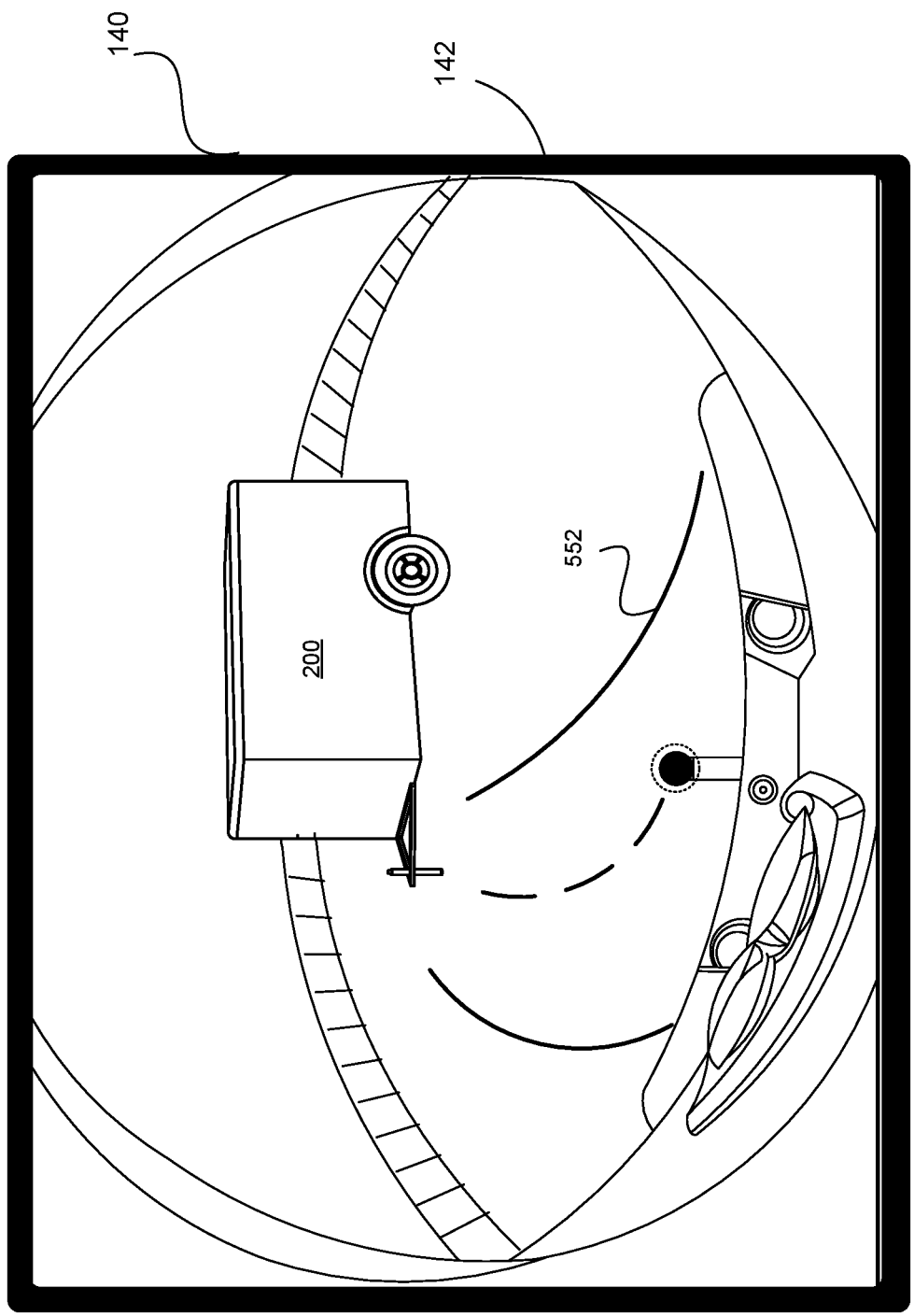
FIG. 1C is a schematic view of an exemplary user interface for detecting a trailer hitch receiver location for the vehicle in a second location.
Figure 2:
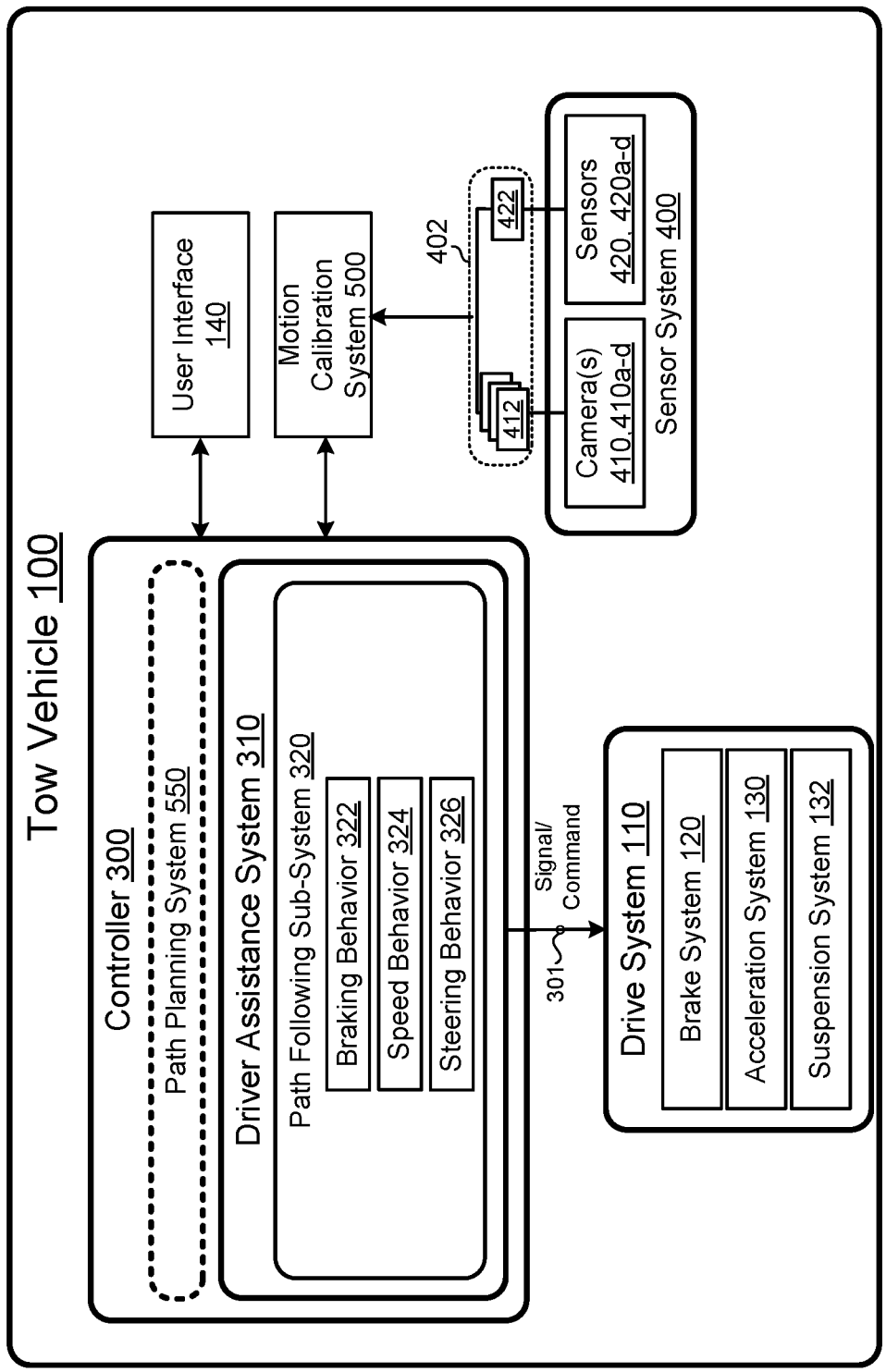
FIG. 2 is perspective views of an exemplary tow vehicle.

Referring to FIGS. 1A-2, in some implementations, a driver of a tow vehicle 100 wants to tow a trailer 200. The tow vehicle 100 may be configured with a driver assistance system 300 to provide guidance to the driver to drive towards the selected trailer 200. The tow vehicle 100 may include a drive system 110 that maneuvers the tow vehicle 100 across a road surface based on drive commands having x, y, and z components, for example. As shown, the drive system 110 includes a front right wheel 112, 112, a front left wheel 112, 112b, a rear right wheel 112, 112c, and a rear left wheel 112, 112d. The drive system 110 may include other wheel configurations as well. The drive system 110 may also include a brake system 120 that includes brakes associated with each wheel 112, 112-d, and an acceleration system 130 that is configured to adjust a speed and direction of the tow vehicle 100. In addition, the drive system 110 may include a suspension system 132 that includes tires associates with each wheel 112, 112-d, tire air, springs, shock absorbers, and linkages that connect the tow vehicle 100 to its wheels 112, 112-d and allows relative motion between the tow vehicle 100 and the wheels 112, 112-d. The suspension system 132 improves the road handling of the tow vehicle 100 and provides a better ride quality by isolating road noise, bumps, and vibrations. In addition, the suspension system 132 is configured to adjust a height of the tow vehicle 100 allowing the tow vehicle hitch 160 to align with the trailer hitch 210, which aids in connection between the tow vehicle 100 and the trailer 200.

The tow vehicle 100 may move across the road surface by various combinations of movements relative to three mutually perpendicular axes defined by the tow vehicle 100: a transverse axis X, a fore-aft axis Y, and a central vertical axis Z. The transverse axis x, extends between a right side R and a left side of the tow vehicle 100. A forward drive direction along the fore-aft axis Y is designated as F, also referred to as a forward motion. In addition, an aft or rearward drive direction along the fore-aft direction Y is designated as R, also referred to as rearward motion. When the suspension system 132 adjusts the suspension of the tow vehicle 100, the tow vehicle 100 may tilt about the X axis and or Y axis, or move along the central vertical axis Z.

A driver assistance system 310 may include a user interface 140. The user interface 140 may be a display that is incorporated into the vehicle or may be provided on a separate device, such as a personal wireless device. The user interface 140 receives one or more user commands from the driver via one or more input mechanisms 142, such as a control knob, or a touch screen display and/or displays one or more notifications to the driver. The user interface 140 is in communication with a vehicle controller 300, which is in turn in communication and sensor system 400 and a drive system 110. In some examples, the user interface 140 displays an image of an environment of the tow vehicle 100 leading to one or more commands being received by the user interface 140 (from the driver) that initiate execution of one or more behaviors. The vehicle controller 300 includes a computing device (or processor) 302 (e.g., central processing unit having one or more computing processors) in communication with non-transitory memory 304 (e.g., a hard disk, flash memory, random-access memory) capable of storing instructions executable on the computing processor(s)).

The vehicle controller 300 executes a driver assistance system 310, which in turn includes a path following sub-system 320. The path following sub-system 320 receives a planned path 552 (FIGS. 3A and 3B) from a path planning system 550 and executes behaviors 322-330 that send commands 301 to the drive system 110, leading to the tow vehicle 100 autonomously driving about the planned path 552 in a rearward direction R.

The path following sub-system 320 includes, as a braking behavior 322, a speed behavior 324, a steering behavior 326, and possibly additional behaviors, such as a hitch connect behavior, and a suspension adjustment behavior. Each behavior 322-326 cause the tow vehicle 100 to take an action, such as driving backward, turning at a specific angle, speeding, slowing down, among others. The vehicle controller 300 may maneuver the tow vehicle 100 in any direction across the road surface by controlling the drive system 110, more specifically by issuing commands 301 to the drive system 110.

For example, the vehicle controller 300 may maneuver the tow vehicle 100 from an initial position to a final position. In the final position, a hitch ball 162 of the tow vehicle 100 aligns with a hitch coupler 212 of the trailer 200 connecting the tow vehicle 100 and the selected trailer 200.

The tow vehicle 100 may include a sensor system 400 to provide reliable and robust autonomous driving. The sensor system 400 may include different types of sensors that may be used separately or with one another to create a perception of the tow vehicle's environment that is used for the tow vehicle 100 to autonomously drive and make intelligent decisions based on objects and obstacles detected by the sensor system 400. The sensors may include, but not limited to, one or more imaging devices (such as cameras) 410, and sensors 420 such as, but not limited to, radar, sonar, LIDAR (Light Detection and Ranging, which can entail optical remote sensing that measures properties of scattered light to find range and/or other information of a distant target), LADAR (Laser Detection and Ranging), etc. In addition, the camera(s) 410 and the sensor(s) 420 may be used to alert the driver of possible obstacles when the tow vehicle 100 is traveling in the forward direction F or in the rearward direction R, by way of audible alerts and/or visual alerts via the user interface 140. Therefore, the sensor system 400 is especially useful for increasing safety in tow vehicles 100 which operate under semi-autonomous or autonomous conditions.

The sensor system 400 sends sensor system data 402 to the driver assistance system 310. The sensor system data 402 includes images 412 from the cameras 410, 410a-d and sensor data 422 from the sensors 420, 420a-d In some implementations, the tow vehicle 100 includes a rear camera 410, 410a that is mounted to provide a view of a rear driving path for the tow vehicle 100. Additionally, in some examples, the tow vehicle 100 includes a front camera 410, 410b to provide a view of a front driving path for the tow vehicle 100, a right camera 410, 410c positioned on the right side of the tow vehicle 100, and a left camera 410, 410d positioned on the left side of the tow vehicle 100. The left and right cameras 410, 410c, 410d provide additional side views of the tow vehicle 100. In this case, the tow vehicle 100 may detect object and obstacles positioned on either side of the tow vehicle 100, in addition to the objects and obstacle detected along the front and rear driving paths. The camera(s) 410, 410a-d may be a monocular camera, binocular camera, or another type of sensing device capable of providing a view of the rear travelling path of the tow vehicle 100. Likewise, sensors 420a-d may be located at various location around the exterior of the vehicle 100.

Referring back to FIG. 1A-2, once the path planning system 550 plans a path 552, the path following sub-system 320 is configured to execute behaviors the cause the drive system 110 to autonomously follow the planned path 552. Therefore, the path following sub-system 320 includes one or more behaviors 322-330 that once executed allow for the autonomous driving of the tow vehicle 100 along the planned path 552. The behaviors 322-330 may include, but are not limited to a braking behavior 322, a speed behavior 324, a steering behavior 326, a hitch connect behavior 328, and a suspension adjustment behavior 330.

In this embodiment the path planning system 550 receives information via the user interface 140 and the user input mechanism 142. For example, the user interface 140 and input mechanism may be one or a combination of a screen, touch screen, personal device, control knob, joy stick, slider knob or other input mechanisms. In the example shown, the user interface 140 is a touch screen and the input mechanism 142 is a control knob.

The planned path 552 of the vehicle hitch ball 162 may be displayed as an overlay (shown by phantom line in FIG. 1B) on the user interface 140. The initial planned panned path 552 overlay may be based on the vehicles 100 current steering behavior 326. Using the input mechanism 142 the user may adjust a planned length and trajectory of the planned path 552 until the planned path 552 aligns with the trailer hitch receiver location 212. Once the user has selected the desired planned path 552 length and trajectory (shown by phantom line in FIG. 1B) the path planning system 550 can determine the braking behavior 322, speed behavior 324 and steering behavior 326 necessary to follow the planned path 552. This information can be sent to the path following sub-system 320 to be executed.

Alternatively, the user interface 140 and input mechanism 142 may be used to input a vehicle trajectory and the system user may control the speed and braking of the vehicle 100.

The braking behavior 322 may be executed to either stop the tow vehicle 100 or to slow down the tow vehicle based on the planned path 552. The braking behavior 322 sends a signal or command 301 to the drive system 110, e.g., the brake system 120, to either stop the tow vehicle 100 or reduce the speed of the tow vehicle 100.

The speed behavior 324 may be executed to change the speed of the tow vehicle 100 by either accelerating or decelerating based on the planned path 552. The speed behavior 324 sends a signal or command 301 to the brake system 120 for decelerating or the acceleration system 130 for accelerating.

The steering behavior 326 may be executed to change the direction of the tow vehicle 100 based on the planned path. As such, the steering behavior 326 sends the acceleration system 130 a signal or command 301 indicative of an angle of steering causing the drive system 110 to change direction.

In addition to the user interface 140 and input mechanism 142 the path planning system 550 uses information from the sensor system 44 to align the input selection form the user with the physical locations of the vehicle 100 and the trailer 200 as recorded by the sensors 420 and the camera 410. That is, the path planning system 550 must determine the path from on the user input based on the camera 410, 410a-d image and the physical location of the vehicle 100 and trailer 220 as measured by the sensor system 400. Therefore, a motion calibration system 600 to calibrate alignment between the sensors system 400 and the path following sub-systems 320 may be used.

Figure 3:
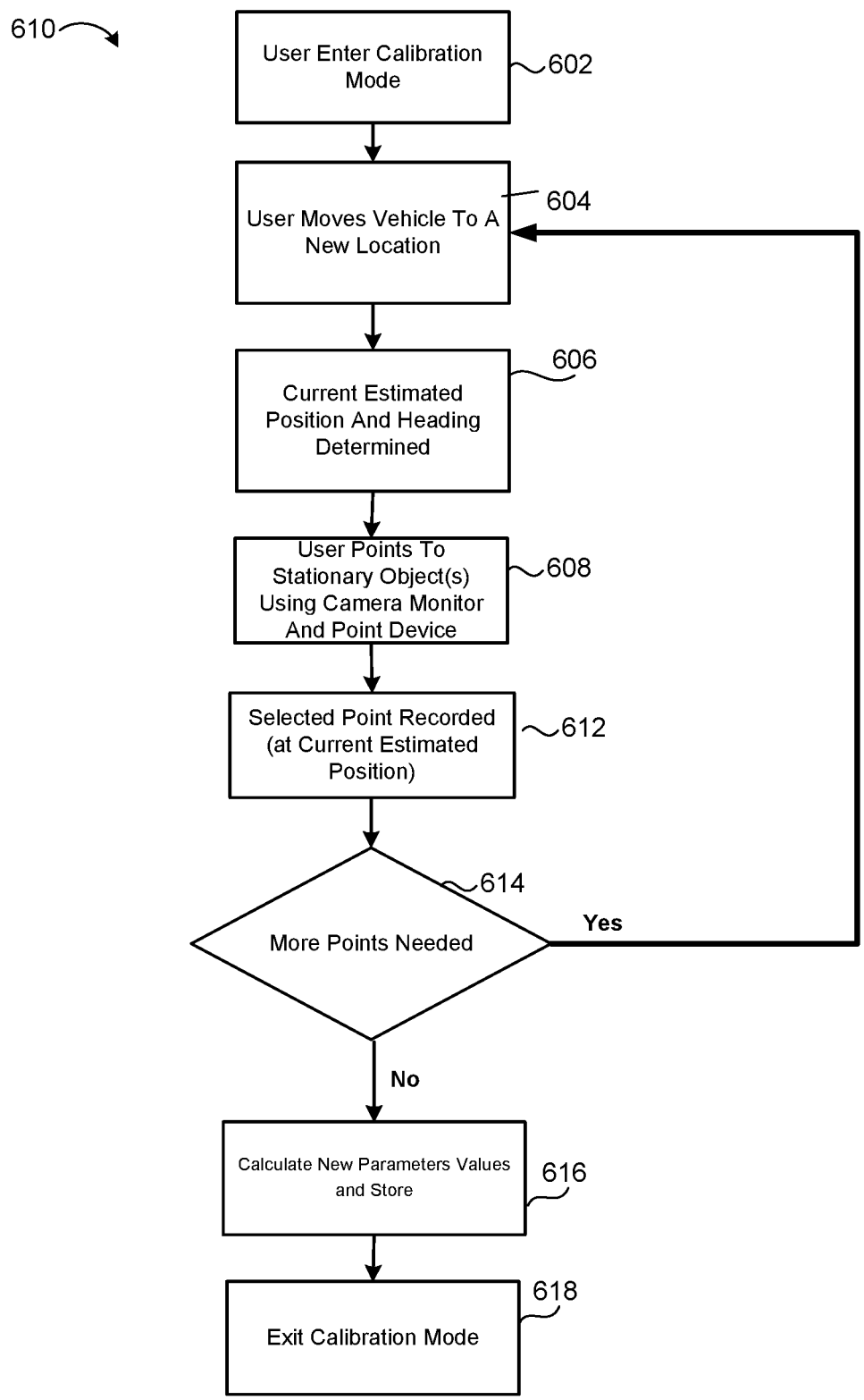
FIG. 3 is a flow diagram of an exemplary calibration of vehicle motion for attachment to a trailer.

Referring to FIGS. 1A and 2-3 the motion calibration system 600 utilizes a motion estimation algorithm that accurately outputs relative vehicle position and speed. This motion estimation algorithm will be a function of several vehicle parameters, such as steering ratio, steering offset, wheelbase, track width, etc. For standard vehicle driving functions these parameters are likely not known accurately enough for good motion estimation necessary for a driver assistance system 320 which provides automated hitch assistance. The motion calibration system 600 provides an algorithm and a method 610 for determining these values more accurately. In the example application (trailer hitch assist), the method does not require any special equipment beside what is already on the vehicle 100.

The method 610 provides for the user to "point to" the same fixed feature from different points of view using the user interface 140, which displays an image from the camera 410, 410a-d, and the input mechanism 142 to "point to" the features. That is, user selects at least one stationary object or feature displayed on the user interface 140 using the input mechanism to identify the selected feature or object. The feature or object may be the hitch ball receiver and may include addition objects or features relative to the trailer such as, trailer corners, decals, identifying marks, wheels, etc.

The vehicle is then driven to a new location where the camera 410, 410a still has a view of the trailer 200 and the user re-selects the feature(s) location(s) using the user interface 140. An optimization routine (e.g. quasi-Newton) adjusts vehicle kinematic parameters to achieve the smallest errors for the points selected by the user.

There is a need for an absolute reference to compare the motion estimation algorithm output to. Therefore, we propose an alternative absolute reference which utilizes the vehicle camera 410, 410a-d and some input mechanism on the user interface 142. In this embodiment the input mechanism may be a touch-screen, or the same control knob, or some combination thereof which allows the user to select one or more features on the displayed image 412.

One embodiment of the motion calibration system 600 provides the user (e.g. end user or factory end-of-line calibration technician) activates the motion estimation algorithm through a special "calibration mode", shown at 602. In order to record the current estimated position and heading may include some appreciable vehicle motion that would may need to take place, shown at 604. The user may drive the vehicle some distance (say 10 meters) while also turning the steering wheel so that the vehicle motion wasn't perfectly straight. Following this movement, the current estimated position and heading of the vehicle may be recorded, shown at 606. Following this, the user would view the vehicle rear camera monitor (or front or side camera monitor) through the user interface 140 and use an input device 142 such as a pointing device (touchscreen, knob, mouse, etc.) to pick out a particular static world feature which is displayed on the image 412, shown at 608. This feature could be a trailer coupler, for example, for the case of a truck hitch assist system, but it could also be any other fixed point that is easy for the user to identify and point to using a pointing device 142 with the camera monitor 140. Then, this procedure would be repeated one or more additional times with a new maneuver and the user pointing to the same feature at the new locations, shown at 614.

Alternatively, the captured images can be analyzed by the controller 300 to select a feature in the first image and a feature in the second image and using feature recognition. The feature recognition may include defining a plurality of feature recognition points associated with the first feature and a plurality of feature recognition points associated with the first feature. Determining that the first feature and the second feature are the same object when the feature from the first image and the second image that have a sufficient number of matching recognition points.

To continue, after collection the estimated position and heading information as well as corresponding trailer features from multiple vehicle positions the motional calibration system can calculate a new set of motion parameters based on the collected data and store that information, shown at 616. These steps provide a set of equations (in numerical form) involving the imprecisely known vehicle parameters. The error in the equations can be minimized (numerically) to improve upon the existing parameters and obtain more accurate ones. The problem can be solved with nonlinear least squares solver methods, for example, a quasi-Newton method (e.g. BFGS) can be used. The new motion calibration data can used to more accurately determine and predict the vehicle 100. motion 100 based on the sensors system data 401 and the path planning system 550. Therefore, the vehicle 100 can exit calibration mode, shown at 618.

More specifically, we propose to optimize a function whose input is the set of parameters which aren't perfectly known (wheelbase, track width, tire diameter, steering ratio/offset, etc.) and whose output is some measure of the error of the fixed points in the images (from different viewpoints).

As mentioned previously, the procedure needs to be repeated multiple times, depending on the number of parameters to be estimated. Each iteration provides 2 equations (associated with the 2 image point coordinates), and there are 3+N unknowns, where N is the number of parameters to be determined. The "3" in "3+N" comes from the unknown world coordinates of the fixed point. So, we have 2M equations and 3+N unknowns, and therefore, 2M must be at least 3+N (to have as many equations as unknown parameters). Therefore the number of iterations is given by M in the following inequality:

$$M \gtrsim (3+N)/2$$

For the case of optimizing 1 unknown parameter (say steering offset), we must do at least 2 iterations: (3+1)/2. For 5 unknown parameters (say wheelbase, track width, tire diameter, steering ratio, steering offset), we must do at least 4 iterations: (3+5)/2.

The motion calibration system may be used the first time the driver assistance system 310 is used and may also be updated at periodic intervals as suggested by the driver assistance system 310, e.g. every 50 or 100 uses. Alternatively, it may be desirable to calibrate at user discretion, e.g when a new trailer is being used with hitch assist or the driver notices a change in the accuracy of performance by the vehicle 100.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method of calibrating a motion estimation algorithm of a driver assistance system supported by a vehicle before executing the driver assistance system, where the driver assistance system provides guidance to the driver to driver towards a trailer, the method comprising:
   during a motion calibration mode:
   entering the motion calibration mode for a driver assistance system;

moving a vehicle to a first location and heading;
determining with a controller for the driver assistance system a current estimated position and heading of the vehicle at the first location;
displaying a first image from at least one camera outwardly facing from the vehicle;
selecting at least one feature in the first image by using an input mechanism and recording with the controller for the driver assistance system at least one selected feature data at the first location and heading;
moving a vehicle to at least a second location and heading;
determining with the controller for the driver assistance system a current estimated position and heading of the vehicle at the at least second location;
displaying a second image from the at least one camera;
selecting at least one feature in the second image by using the input mechanism and recording with the controller for the driver assistance system at least one selected feature data at the second location and heading, wherein the at least one selected feature in the second image is the same feature as the at least one selected feature in the first image; and
calculating, with the controller, calibration vehicle motion parameter values based on the first estimated position and heading, the second estimated position and heading, the first recorded at least one feature data, and the second recorded at least one feature data; and
during an implementation mode:
receiving current vehicle motion parameter values; and
determining a vehicle position based on the calibration vehicle motion parameters and the current vehicle motion parameters.

2. The method of claim 1,
wherein the vehicle motion parameter values include at least one of: wheelbase, track width, tire diameter, steering offset and steering ratio, and
wherein moving the vehicle includes: steering, braking, and accelerating.

3. The method of claim 1, wherein the driver assistance system is a hitch assist system and the at least one feature is at least a hitch receiver on a trailer.

4. The method of claim 1, wherein the motion calibration mode is completed at least a first time the driver assistance system is used.

5. The method of claim 4, wherein the motion calibration mode is executed at periodic intervals or at user discretion.

6. The method of claim 1, wherein the input mechanism is at least one of: a touchscreen, a knob control, a mouse, joystick, a slider bar.

7. The method of claim 1, wherein determining the current estimated position and heading of the vehicle at the second location further comprises calculating the position and heading from wheel travel sensor data and steering angle sensor data over time that is detected by a sensor system while the vehicle is moving from the first position to the second position.

8. A method of calibrating a driver assistance system of a vehicle, the method comprising:
entering a motion calibration mode for a driver assistance system;
determining with a controller for the driver assistance system a first estimated position and heading of the vehicle at a first location;
capturing a first image from at least one camera outwardly facing from the vehicle and selecting at least one feature in the first image;
moving a vehicle to at least a second location and heading and determining a second estimated position and heading of the vehicle;
capturing a second image from at least one camera outwardly facing from the vehicle and selecting at least one feature in the second image, wherein the at least one selected feature in the second image is the same feature as the at least one selected feature in the first image; and
calculating, with the controller, calibration vehicle motion parameter values based on the first estimated position and heading, the second estimated position and heading, the first recorded at least one feature data, and the second recorded at least one feature data;
during an implementation mode:
receiving current vehicle motion parameter values; and
determining a vehicle position based on the calibration vehicle motion parameters and the current vehicle motion parameters.

9. The method of claim 8,
wherein the vehicle motion parameter values include at least one of: wheelbase, track width, tire diameter, steering offset and steering ratio, and
wherein moving the vehicle includes: steering, braking, and acceleration accelerating.

10. The method of claim 8, wherein the driver assistance system is a hitch assist system and the at least one feature is at least a hitch receiver on a trailer.

11. The method of claim 8, wherein the motion calibration mode is executed at a first time the driver assistance system is used.

12. The method of claim 11, wherein the motion calibration mode is executed at periodic intervals or at user discretion.

13. The method of claim 8, further comprising selecting the at least one feature with an input mechanism and, wherein the input mechanism is at least one of: a touchscreen, a knob control, a mouse, joystick, a slider bar.

14. The method of claim 8, wherein determining the second estimated position and heading of the vehicle at the second location further comprises calculating the position and heading from wheel travel sensor data and steering angle sensor data over time that is detected by a sensor system while the vehicle is moving from the first position to the second position.

15. A driver assistance system comprising a controller having instructions for calibrating vehicle motion parameter values for the driver assistance system, the instructions including:
during a motion calibration mode:
determining a first estimated position and heading of the vehicle at a first location;
capturing a first image from at least one camera outwardly facing from the vehicle and selecting at least one feature in the first image;
determining a second estimated position and heading of the vehicle after the vehicle has been moved to a second location;
capturing a second image from at least one camera outwardly facing from the vehicle and selecting at least one feature in the second image, wherein the at least one selected feature in the second image is the same feature as the at least one selected feature in the first image; and calculating with the controller calibration vehicle motion parameter values based on the first estimated position and heading, second estimated position and heading, first recorded at least one feature data, and second recorded at least one feature data; and during an implementation mode:
receiving current vehicle motion parameter values; and
determining a vehicle position based on the calibration vehicle motion parameters and the current vehicle motion parameters.

16. The driver assistance system of claim 15,
wherein the vehicle motion parameter values include at least one of: wheelbase, track width, tire diameter, steering offset and steering ratio, and
wherein moving the vehicle includes: steering, braking, and acceleration.

17. The driver assistance system of claim 15, wherein the driver assistance system is a hitch assist system and the at least one feature is at least a hitch receiver on a trailer.

18. The driver assistance system of claim 15, wherein the motion calibration mode is executed at a first time the driver assistance system is used, wherein the motion calibration mode is updated at periodic intervals or at user discretion.

19. The driver assistance system of claim 15, further comprising an input mechanism to select the at least one feature, wherein the input mechanism is at least one of: a touchscreen, a knob control, a mouse, joystick, a slider bar.

20. The driver assistance system of claim 15, wherein the second estimated position and heading of the vehicle at the second location is determined calculating the position and heading from wheel travel sensor data and steering angle sensor data over time that is detected by a sensor system while the vehicle is moving from the first position to the second position.

* * * * *